(12) United States Patent
Narayanan

(10) Patent No.: US 8,209,182 B2
(45) Date of Patent: Jun. 26, 2012

(54) EMOTION RECOGNITION SYSTEM

(75) Inventor: Shrikanth S. Narayanan, Santa Monica, CA (US)

(73) Assignee: University of Southern California, Los Angeles, CA (US)

( * ) Notice: Subject to any disclaimer, the term of this patent is extended or adjusted under 35 U.S.C. 154(b) by 557 days.

(21) Appl. No.: 11/565,194

(22) Filed: Nov. 30, 2006

(65) Prior Publication Data

US 2008/0052080 A1 Feb. 28, 2008

Related U.S. Application Data

(60) Provisional application No. 60/740,902, filed on Nov. 30, 2005.

(51) Int. Cl.
*G10L 21/00* (2006.01)
(52) U.S. Cl. ........ 704/270; 704/275; 704/220; 704/211; 704/215; 704/255
(58) Field of Classification Search .......... 704/270, 704/236, 233, 275, 211, 215, 220, 250, 255, 704/267
See application file for complete search history.

(56) References Cited

U.S. PATENT DOCUMENTS

| | | | | |
|---|---|---|---|---|
| 5,367,454 A * | 11/1994 | Kawamoto et al. | ........... | 715/706 |
| 5,987,415 A * | 11/1999 | Breese et al. | ........... | 704/270 |
| 6,151,571 A * | 11/2000 | Pertrushin | ........... | 704/209 |
| 6,185,534 B1 * | 2/2001 | Breese et al. | ........... | 704/270 |
| 6,275,806 B1 * | 8/2001 | Pertrushin | ........... | 704/272 |
| 6,332,143 B1 * | 12/2001 | Chase | ........... | 707/100 |
| 7,590,538 B2 * | 9/2009 | St. John | ........... | 704/246 |
| 7,940,914 B2 * | 5/2011 | Petrushin | ........... | 379/265.06 |
| 2002/0002460 A1 * | 1/2002 | Pertrushin | ........... | 704/270 |
| 2002/0002464 A1 * | 1/2002 | Pertrushin | ........... | 704/275 |
| 2002/0135618 A1 * | 9/2002 | Maes et al. | ........... | 345/767 |
| 2003/0033145 A1 * | 2/2003 | Petrushin | ........... | 704/236 |
| 2003/0069728 A1 * | 4/2003 | Tato et al. | ........... | 704/231 |
| 2005/0102135 A1 * | 5/2005 | Goronzy et al. | ........... | 704/213 |
| 2005/0240411 A1 * | 10/2005 | Yacoub | ........... | 704/270 |
| 2006/0122834 A1 * | 6/2006 | Bennett | ........... | 704/256 |

OTHER PUBLICATIONS

Lee et al. Combining Acoustic and Language Information for Emotion Recognition, Sep. 2002, International Conference on Spoken Language Processing.*
Fragopanagoes et al. Emotion recognition in human-computer interaction, Mar. 2005, Neural Networks.*
Iain R. Murray and John L. Arnott, "Toward the Simulation of Emotion in Synthetic Speech: A Review of the Literature on Human Vocal Emotion", p. 1097-1108.
IEEE Signal Process, "Emotion Recognition in Human-Computer Interaction", p. 35-80.

* cited by examiner

*Primary Examiner* — Vijay B Chawan
(74) *Attorney, Agent, or Firm* — McDermott Will & Emery LLP

(57) ABSTRACT

An emotion recognition system for assessing human emotional behavior from communication by a speaker includes a processing system configured to receive signals representative of the verbal and/or non-verbal communication. The processing system derives signal features from the received signals. The processing system is further configured to implement at least one intermediate mapping between the signal features and one or more elements of an emotional ontology in order to perform an emotion recognition decision. The emotional ontology provides a gradient representation of the human emotional behavior.

19 Claims, 2 Drawing Sheets

EMOTION RECOGNITION SYSTEM

CROSS-REFERENCE TO RELATED APPLICATIONS

This application is based upon, and claims the benefit of priority under 35 U.S.C. §119(e) from U.S. Provisional Patent Application Ser. No. 60/740,902 (the "'902 provisional application"), filed Nov. 30, 2005, entitled "Scalable Adaptive System For Automated Recognition Of Human Emotional Expressive Behavior." The content of the '902 provisional application is incorporated herein by reference in its entirety as though fully set forth.

STATEMENT REGARDING FEDERALLY SPONSORED RESEARCH

This work was made with government support under Grant No. EEC-9529152 awarded by the National Science Foundation; by Grant No. DAAD 19-99-0046 awarded by the Department of the Army; and by Grant No. 0238514 awarded by the National Science Foundation. The government has certain rights in the invention.

FIELD OF THE DISCLOSURE

The present disclosure relates to systems and methods for assessing human emotional behavior from human communication.

BACKGROUND

Human communication conveys important information not only about intent but also about desires and emotions as well. In particular, the importance of automatically recognizing emotions from human speech and other communication cues has grown with the increasing role of spoken language and gesture interfaces in human-computer interactions and computer mediated applications.

Current automatic emotion recognizers typically assign category labels to emotional states, such as "angry" or "sad," relying on signal processing and pattern recognition techniques. Efforts involving human emotion recognition have mostly relied on mapping cues such as speech acoustics (for example energy and pitch) and/or facial expressions to some target emotion category or representation.

A major challenge to such approaches is that expressive human behavior is highly variable and depends on a number of factors. These factors may include the context and domain of the expressive behavior, and may be expressed through multiple channels. Therefore, categorical representations for emotions and simple pattern recognition schemes may not be adequate in describing real-life human emotions.

There is a need for methods and systems that provide a holistic and multi-tier approach to the problem of emotion recognition.

SUMMARY

An emotion recognition system for assessing human emotional behavior from communication by a speaker includes a processing system configured to receive signals representative of the communication. The processing system if configured to derive signal features from the received signals. The processing system is further configured to implement at least one intermediate mapping between the signal features and one or more elements of an emotional ontology, in order to perform an emotion recognition decision. The emotional ontology provides a gradient representation of the human emotional behavior.

DETAILED DESCRIPTION

In the present disclosure, methods and systems are described that provide a multi-tier approach to emotion recognition by performing intermediate mappings between speech signals and symbolic descriptions of emotions based on an emotional ontology. This ontology allows for a plurality of representations, and relations between them, to describe human emotional states.

Figure 1:
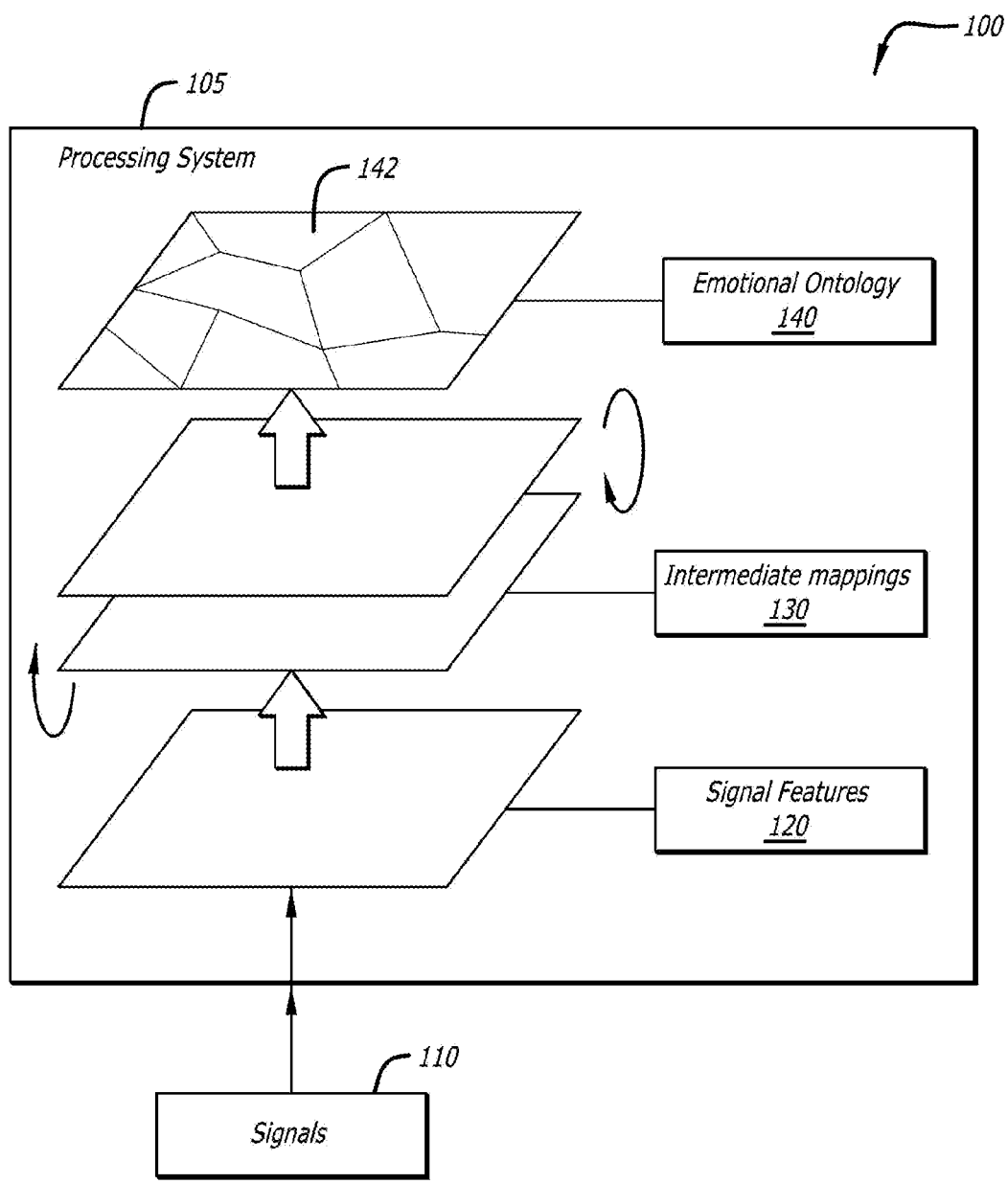
FIG. 1 illustrates a functional diagram of an emotion recognition system in accordance with one embodiment of the present disclosure.

FIG. 1 illustrates a functional diagram of an emotion recognition system 100 that assesses human emotional behavior of a speaker from the speaker's communication, in accordance with one embodiment of the present disclosure. In overview, the emotion recognition system 100 includes a processing system 105 that receives signals 110 representative of the speech communication. The processing system 105 derives signal features 120 from the received signals. The processing system 105 then performs emotion recognition decisions by implementing one or more intermediate mappings 130 between the signal features 120 and elements 142 of an emotional ontology 140.

The signals 110 received by the processing system 105 may relate to one or more aspects of the speaker's communication, including but not limited to: vocal expressions by the speaker; heart rate of the speaker; facial expressions of the speaker; gestures of the speaker; and skin temperature of the speaker. Vocal expressions by the speaker may include words, utterances, hesitations and other disfluencies, by way of example.

The signal features 120 derived from these signals may comprise both verbal and non-verbal cues of the human expressive behavior. By way of example, the signal features may include acoustic, lexical, or discourse information about the signals.

The emotional ontology 140 provides a gradient representation of the human expressive behavior, i.e. provides a much greater flexibility and gradation in symbolic descriptions of human expressive behavior. Typically, user-level description of expressions of emotion (for example linguistic, cognitive or affective expressions of emotion) have been provided in terms of words or phrases. These words may include the following, by way of example: happy, sad, frustrated, bored, very disappointing, extremely delighted. Many other descriptors may be used. These descriptors have often been the target of automatic classification, in conventional emotional recognition systems.

The emotional ontology or expressive language ontology 140 provides a method of organizing the expressive linguistic space in a way that allows for a flexible and graded representation of the speaker's emotional states. The emotional ontology 140 is derived from linguistic descriptions such as words and phrases, with or without enriched annotations such as those made available from lexica and other lexical resources.

In particular, the emotional ontology 140 models the expressive linguistic space through clusters of a plurality of expressive types, viewed as hidden variables, and the relations between the variables. In some embodiments, these clusters may overlap. This quantitative model allows for a gradient representation of the speaker's emotional states.

The elements 142 of the emotional ontology 140 may thus include, but are not limited to: expressive variables, clusters of expressive variables, and relations between the clusters and/or the variables. In one embodiment of the present disclosure, the emotional ontology 140 may be based on a statistical graphical model in which the conditional dependency between the variables can be modeled by probabilities. In this embodiment, the relations between the variables are probabilities that model a conditional dependency between the variables.

In an alternate embodiment, the emotional ontology 140 may be based on a graph, for example a weighted finite state transducer, in which the weights denote the strength of the relation between the variables. In this embodiment, the relations between the variables include weighted graphs, where each weight denoting a strength of the relationships between the variables.

In both embodiments described above, the model, including the probabilities or weights denoting the relation between the variables, may be assigned directly by humans or inferred from other indirect signal sources.

In another embodiment, the clustering of the group of variables may be based on emotional divergence between distributions of variables. Such a clustering may facilitate quantizing the emotional ontological space.

The emotion recognition system 100 may support any measurable cue of human expressions, i.e. any measurable signal features. Both verbal and non-verbal communication cues may be used by the system 100.

The cues or signal features may be integrated at a plurality of time scales. The time scale for processing and analysis may be internally specified by signal change heuristics, such presence or absence of speech, scene changes, audio quality changes. Alternatively, the time scales may be linguistic time scales, such as subphoneme, phoneme, syllable, word, phrase, utterance, sentence, discourse, and session. The time scales may include any other pre-selected analysis time frames. In one embodiment, linguistic timescales such as phonemes, syllables and phrase boundaries may be derived automatically from the speech communication.

The system 100 may support a plurality of signal features or feature types derived from the signals. The signal features may be used directly for mapping into emotional variables, by themselves or fused with other signal features. Alternatively, the signal features may be used to derive one or more intermediate mappings 130.

The signal features may be in the time domain or in some transform domain. Examples of time domain features may include, but are not limited to: energy and intensity contours; amplitudes; and other features derived from the energy and intensity contours and/or the amplitudes.

Transform domain features may include spectral domain features, and derivatives thereof such as pitch, formants, filterbank energies and functions thereof. Transform domain features may further include variants of time-frequency transforms, such as wavelets.

The signal features 120 may be further processed, for example through the use of feature selection/reduction techniques.

The system 100 implements one or more intermediate or multi-tier mappings 130 from the signal features (or cues) 120 to ultimately the expressive representations specified in the emotional ontology 140. The intermediate mappings 130 may provide signal abstraction. Alternatively, the intermediate mappings 130 may convey some intermediate expressive state information. The intermediate mappings may be between one or more elements of the emotional ontology 140 to one or more signal features or cues.

A plurality of intermediate mappings may be implemented in order to enable a more comprehensive appraisal. In one embodiment, an automatic speech recognizer may be used to derive phoneme, syllable, word, phrase level information. In another embodiment, a speech rate estimator and/or a boundary detector may be used to inform prominence and other linguistic expressive markers. In another embodiment, lexical analyzer to calculate emotional salience of word sequences, as described further below. In another embodiment, a parser may be used to provide emotionally salient parse structures. In another embodiment, a speech act detector may be used to provide communication act information. In another embodiment, an out of vocabulary detector and/or an automatic word class detector may be used to detect word class, such as swear words or politeness markers. In another embodiment, audio classifiers may be used to classify laughter, cry, screams, and other cues of emotions. The audio classifiers may detect nonverbal cues of emotion. The audio classifiers may also detect verbal disfluency as cues of emotion.

In another embodiment, a facial expression analyzer may be used to analyze facial expressions and their changes. In another embodiment, hand and head gesture analyzer may be used to analyze hand and head gestures.

Another example of intermediate mappings may include models of signal behavior such as pitch trajectory models and energy contour models. Other examples of mappings may include continuous tracking of activation, valence and dominance at multiple time resolutions using signal features 120, as well as one or more of the intermediate mappings 130 described above. The top layer of the intermediate mapping is formed by the elements of the emotional ontology The training of the classifiers described above may be derived from known methods, depending on the type of signal models or classifiers used. The methods may include, but are not limited to, hidden Markov models, and Support Vector Machines.

The fusion of information may occur at multiple resolutions so as to provide recognition of expressive behavior at multiple time scales, and along multiple dimensions. The assessment of human emotional behavior based on emotional ontology allows for gradient outcomes as compared against the more conventional categorical output. The availability of weighted relations between emotional variables provides for a ranking of the emotion appraisal decision. This also allows for any uncertainty in assessment to degrade performance in meaningful ways.

In one exemplary application of the emotion recognition system described above, the emotional state of the speaker such as frustration or satisfaction may be detected in voice-driven human computer interactions that may occur for example in an automated call center. Speech, language, and discourse cues may all be combined within the above-described framework for emotion analysis, to yield emotion recognition decisions and results. Acoustic correlates can be reconciled in a systematic way using feature selection and feature reduction methods.

In one embodiment, emotional keywords in the data contained in the speech signals may be identified by calculating the emotional salience of the words. Emotional salience is a measure of how much information a word provides about a given emotion category. The salience of a word in emotion recognition may be defined as mutual information between a specific word and emotion category, as explained further below. Discourse information of emotion recognition can be combined with the acoustic correlates to improve the overall performance of emotion classification by using repetition or correction information. The different information sources can be combined to enable intended emotion recognition. Information fusion may occur at the feature level by building large dimensional input features. Alternatively, the various sources of information (acoustic, lexical, and discourse information for example) may be combined at the decision level, as further described below.

Emotional salience is a concept that is introduced in order to deal with the problem of how to automatically learn and associate emotional information with words (i.e. lexical items) that come from the data in the speech signals. The idea is to automatically learn and spot "emotionally salient words" so as to improve the recognition of emotions. To identify emotionally salient words in the utterances, the information-theoretic concept of "emotional salience" is adopted. An emotionally salient word with respect to a category is one which appears more often in that category than in other categories. The salience measure may be used to find and associate words that are related to emotions in the speech data.

In calculating emotional salience, the words in the utterances may be denoted by $W=\{v_1, v_2, \ldots, v_n, \ldots, v_N\}$ and the set of emotion classes or categories in the emotional ontology. by $E=\{e_1, e_2, \ldots, e_j, \ldots, e_k\}$. In a specific embodiment in which only negative and non-negative emotional states are explored, k=2.

The self mutual information is given by:

$$i(v_n, e_k) = \log \frac{P(e_k \mid v_n)}{P(e_k)},$$

where $P(e_k|v_n)$ is the posterior probability that an utterance containing word or in general a word sequence, $v_n$ implies emotion category $e_k$, and $P(e_k)$ de-notes the prior probability of that emotion category.

From the above equations, it can be seen that if the word $v_n$ in an utterance highly correlates to an emotion category, then $P(e_k|v_n) > P(e_k)$, and $i(v_n, e_k)$ is positive. On the other hand, if the word $v_n$ makes a class $e_k$ less likely, $i(v_n, e_k)$ is negative. If there is no effect by the word, $i(v_n, e_k)$ is zero because $P(e_k|v_n)=P(e_k)$.

The emotional salience of a word over an emotion category set E may be defined as:

$$sal(v_n) = I(E; W = v_n) = \sum_{j=1}^{k} P(e_j \mid v_n) i(v_n, e_l) = \sum_{j=1}^{k} p(e_j \mid v_n) \log \frac{P(e_j \mid v_n)}{P(e_j)}.$$

The definition above indicates that the emotional salience of a word is the Kullback-Leibler distance between the posterior probability of emotin class given the word and the prior probability of the word. Emotional salience is thus a measure of the distance between our knowledge before and after the word was observed. Illustrative examples of salient words in the data corpus have been provided in a table shown in the '902 provisional application, the contents of which have been incorporated by reference in its entirety.

After computing the emotionally salient words in the (training) data corpus, the language-related emotion recognition decision may be computed at the utterance level, as described below.

Let $E_1$ and $E_2$ represent negative and non-negative emotion categories, respectively, and $v_n$ denote the emotionally salient words. Each word in an utterance is assumed to be independent of each other. The effect of automatic speech recognition errors may also be ignored for simplicity. An input utterance, denoted $W=(v_{n1}, v_{n2}, \ldots, v_{nL})$ (where L is the length of the utterance), is mapped to an emotion category, $E_1$ or $E_2$. If the words in an utterance match the emotionally salient words, the value 1 can be output from those words; otherwise the value 0 is output. In other words, the output is a binary output, either 0 or 1. These binary outputs from an utterance are them combined with the emotion category nodes to produce activations, $a_k$, in which k is either 0 (non-negative) or 1 (negative).

The formula for $a_k$ is as follows:

$$a_k = \sum_{m=1}^{n} I_m w_{mk} + w_k$$

where $I_m$ denotes indicator, which has either 0 or 1 representing either a word matched to a salient word or not, $w_{mk}$ denotes connection weight, and $w_k$ is bias.

The connection weights $w_{mk}$, and bias $w_k$ may be defined as follows:

$$w_{mk} = i(v_n, e_k) = \log \frac{P(e_k \mid v_n)}{P(e_k)},$$

$w_k = \log P(E_k)$.

Finally, the feature related to the language information may be chosen to be the difference, i.e., $a_0-a_1$, where 0 represents non-negative and 1 represents negative, in the case in which a decision is made between two emotion categories. Further details of emotional salience are provided in the provisional application, incorporated by reference.

Figure 2:
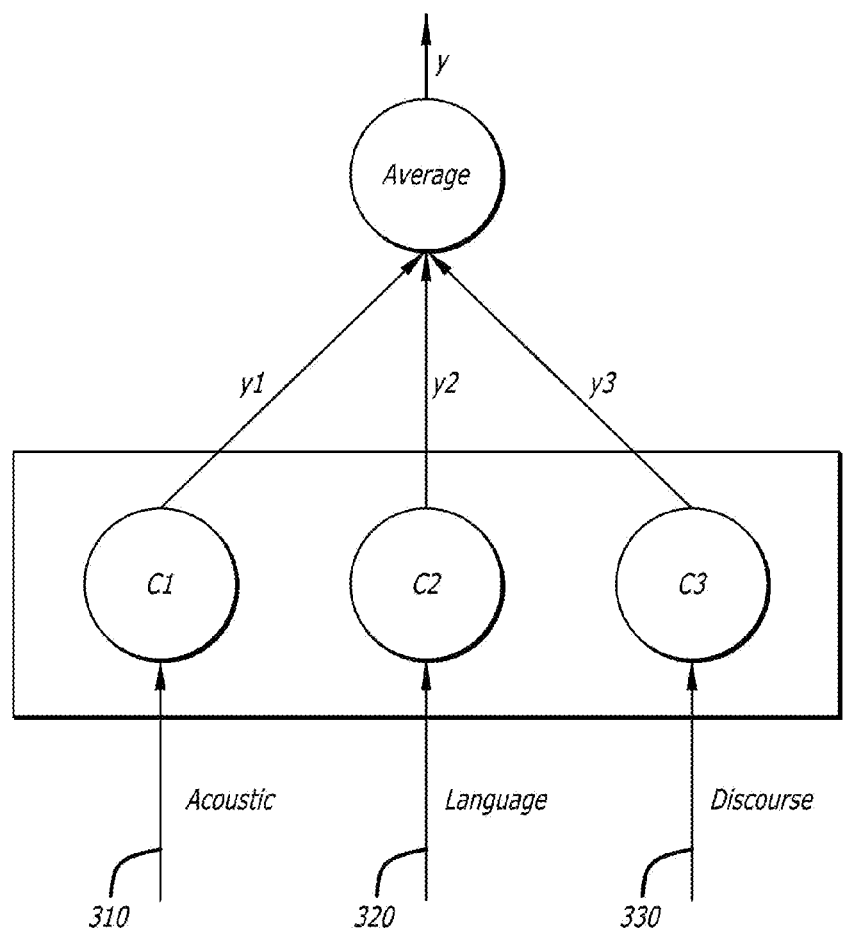
FIG. 2 schematically illustrates one example of combining cues of emotion, namely the combination of acoustic, language, and discourse information.

FIG. 2 schematically illustrates the combination of acoustic, language, and discourse information (denoted using reference numerals 310, 320, and 330, respectively) for classifying emotions from spoken language. It is noted that other cues may be added to the system, in other embodiments of the present disclosure. One possible strategy is to combine these three pieces of information at the feature level by constructing a large feature vector. The problem with feature level fusion/combination is the potential of having to face unwieldy dimensionality, due to the increase in the input feature dimension.

Another scheme for combining several pieces of information is decision level fusion, which is adopted in the embodiment described below. In this embodiment, multiple classifiers may be generated to manipulate the set of multiple information available to the learning algorithm. Three independent classifiers are available, one each for acoustic, language, and discourse information streams, and a final decision is made by combining the output results from these classifiers. In the illustrated embodiment, a simple average of the outputs from each source of information may be computed, resulting in good performance in spite of its simplicity and less support by probabilistic interpretation. Other combination schemes may be adopted.

The problem of combining acoustic, lexical, and discourse information at the decision level is now addressed. Let $x_n$ and $y_n$ denote input and output for a classifier that processes different source of information, where n=1, ..., N, total number of classifiers. Probabilistically, $y_n$ is the estimated posterior probability of class label given data, $\hat{P}(E_k|x_n)$. Let y denote the final output averaged over $y_n$ and x as feature vector representing the whole information, i.e., $x=[x_1, x_2, ..., x_n]^T$ where T denotes transpose. Then the final output of the overall classifiers is given by:

$$y(x) = \frac{1}{N}\sum_{n=1}^{N} y_n(x_n),$$

where N is the number of classifiers to be combined. The output from each classifier is the confidence level of each information stream. At the confidence level, a classifier outputs a numerical value between [0,1] for each class indicating the probability that the given input belongs to that class. Therefore, in probabilistic notation, it can be written as:

$$\hat{P}(E_k|x) = \frac{1}{N}\sum_{n=1}^{N} \hat{P}(E_k|x_n).$$

Since the estimation of posterior probability, $P(E_k|x)$, requires large number of training data converging to Bayes error rate, the estimated posterior probability would have significant error. Averaging the outputs from each classifier can provide less error-sensitive estimation of the posterior probability. The final decision for the winning class j over all possible k emotion classes is made by considering the one that has the highest probability:

$$E_j = \max \hat{P}(E_k|x).$$

Further details regarding combination of information, as well as experimental results using the above-described procedures, are provided in the provisional application. The experimental results show that significant improvements can be made by combining these information sources in the same framework.

Automatic recognition of emotions from human speech by machines is gaining increasing attention. The performance by a computer, and the emotional categories it can cover, are far limited compared with those capable by humans. One main difficulty comes from the fact that there is a lack of complete understanding of emotions in human minds, including a lack of agreement among psychological researchers, which is a prerequisite to satisfaction in attempting to build an effective machine for the task of automatic emotion recognition. Even human beings have difficulty categorizing emotions.

To address this difficulty, the present disclosure proposes an integrated multi-input, multi-output emotion analyzer and recognition system that can provide a multi-perspective assessment of human emotional behavior. The system can provide categorical classification, as well as continuous assessment such as valence activation/dominance, prominence, rate and boundary information. The assessment may be available at phoneme, syllable, word, utterance, and dialog levels, as well as across sessions for each individual. The system can accommodate a variety of verbal and non-verbal communication cues, and other contextual and signal information that may be related explicitly or implicitly to human expressive behavior. The system can also handle imperfect, partial or uncertain information.

A notable aspect of the emotion recognition system described in the present disclosure is that it allows for graded outcomes and their combinations to yield more intuitive descriptions of emotions beyond the traditional categorical utterance level mapping. For example, knowledge about expressive states "closer" to the state of interest in the emotional space can help yield better discrimination of the target state detection and tracking. Also, information can be made available at multiple time scales. Further, uncertainty and missing information can be handled in a more robust fashion.

In sum, methods and systems have been described for assessing human emotional behavior from speech communication. These systems are adaptive and scalable systems that easily accommodate application-dependent emotions and can thus examine a reduced space of emotions.

While certain embodiments have been described of emotion recognition systems and methods, it is to be understood that the concepts implicit in these embodiments may be used in other embodiments as well. The protection of this application is limited solely to the claims that now follow.

In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited in the phrase "step for."

What is claimed is:

1. An emotion recognition system for automatically assessing human emotional behavior from physical phenomena indicative of the human emotional behavior, the system comprising:
   one or more a sensors configured to sense, the physical phenomena; and
   a computer processing system configured to:
      receive a time series of signals from the one or more sensors;
      identify features, in the time series of signals that are indicative of the human emotional behavior; and
      output a gradient, multiple-perspective assessment of the human, emotional behavior based on the identified features that includes a gradient representation of each of multiple emotional states indicated by the human emotional behavior.

2. The system of claim 1, wherein the features include at least one of:
   acoustic information about the signals;
   lexical information about the signals; and
   discourse information about the signals.

3. The system of claim 1, wherein the time series of signals include signals representative of:
   heart rate of the speaker;
   facial expression of the speaker;
   gesture of the speaker; and/or
   skin temperature of the speaker.

4. The system of claim 1, wherein the identification includes assessing probabilities.

5. The system of claim 1, wherein the identification includes applying one or more weights, each weight denoting a strength of a feature in relationship to other features.

6. The system of claim 1, wherein the features comprise features that are adapted to be processed at a plurality of time scales; and wherein the plurality of time scales comprise one or more of: linguistic time scales; and signal change heuristics.

7. The system of claim 6, wherein the signal change heuristics comprise one or more of: presence of speech; absence of speech; change of scene in which the speech communication takes place; and change of audio quality of the speech communication.

8. The system of claim 6, wherein the plurality of time scales comprise linguistic time scales, and wherein the linguistic time scales comprise one or more: a phoneme; a subphoneme; a syllable; a word; a phrase; a phrase boundary; an utterance; a sentence; a discourse; and a session.

9. The system of claim 1,
wherein the features comprise one or more of time domain features and transform domain features;
wherein the time domain features comprise one or more of amplitudes of the SIGNALS; derivatives of the amplitudes; energy contours of the signals; and intensity contours of the signals; and
wherein the transform domain features comprise one or more of: spectral, domain features of the signals; time-frequency transforms of the signals; variants of the time-frequency transforms; and derivatives of the spectral domain features,
wherein the derivatives of the spectral domain features comprise one or more of: pitch; formants; and filterbank energies.

10. The system of claim 1, wherein the processing system comprises at least one of:
an automatic speech recognizer configured to derive from the received signals information relating to one or more of: phonemes; syllables; words; and phrases;
a speech rate estimator and a boundary detector configured to derive information relating to linguistic expressive markers;
a lexical analyzer configured to calculate emotional salience of one or more word Sequences;
a parser configured, to provide emotionally salient parse structures;
a speech act detector configured: to provide communication act information;
a word class detector configured to detect word class;
an audio classifier configured to detect nonverbal cues of emotion;
an audio classifier configured to detect verbal disfluency as cues of emotion;
a facial expression analyzer configured to analyze facial expression of the speaker; and
a gesture analyzer configured to analyze gestures of the speaker.

11. The system of claim 1, wherein the processing system is configured to match the combination of features to both non-negative and negative humane emotional behavior.

12. The system of claim 1 wherein:
the communication includes linguistic and non-linguistic components;
the time series of signals are representative of the linguistic and non-linguistic component; and
the identified features are based on both the linguistic and non-linguistic components.

13. The system of claim 1 wherein the multiple-perspective assessment includes a categorical and a non-categorical assessment.

14. The system of claim 1 wherein the multiple-perspective assessment includes a continuous and a discrete assessment.

15. The system of claim 1 wherein the time series of signals include signals explicitly and implicitly related to human emotional behavior.

16. The system of claim 1 wherein the multiple-perspective assessment includes an assessment specified by a human and an automatically derived assessment.

17. The system of claim 1 wherein the multiple-perspectives include a relationship to one another.

18. The system of claim 1 wherein the multiple-perspective assessment is based on the context of the communication.

19. A method of automatically assessing human emotional behavior from physical phenomena indicative of the human emotional behavior, the method comprising:
sensing the physical phenomena using one or more sensors;
receiving a time series of signals from the one or more sensors using a computer processing system;
identifying features in, the time series of signals that are indicative of the human emotional behavior using a computer processing system; and
outputting a gradient, multiple-perspective assessment of the human emotional behavior based on the identified features that includes a gradient representation of each of multiple emotional states indicated by the emotional behavior using a computer processing system.

* * * * *